S. SUNDERLAND AND A. M. MIDGLEY.
PRODUCTION OF RECIPROCATING MOVEMENTS.
APPLICATION FILED MAY 12, 1919.
1,363,624.
Patented Dec. 28, 1920.
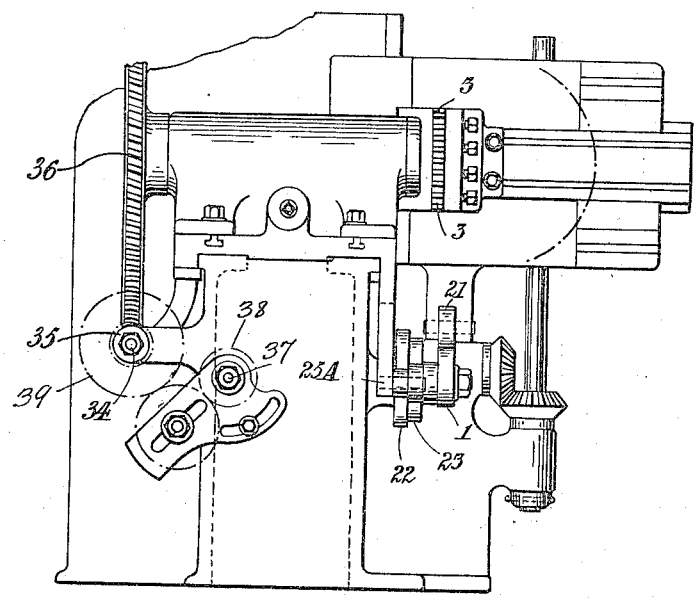
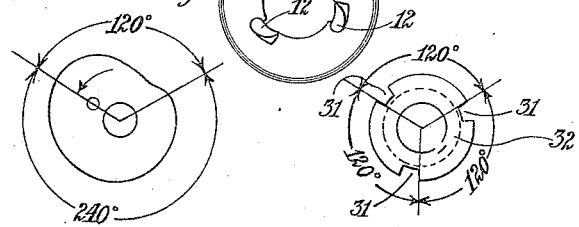

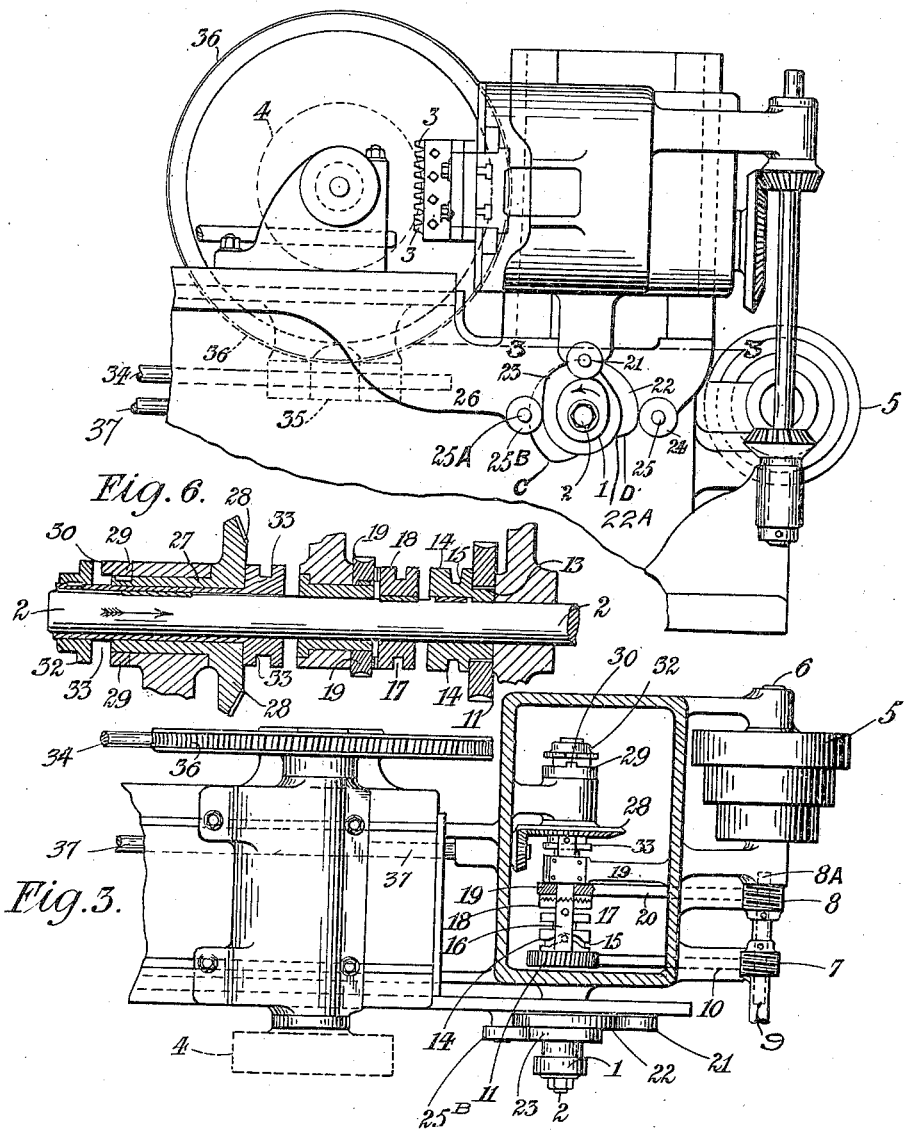

UNITED STATES PATENT OFFICE.

SAM SUNDERLAND, OF KEIGHLEY, AND ARTHUR MAURICE MIDGLEY, OF SUTTON-IN-CRAVEN, NEAR KEIGHLEY, ENGLAND.

PRODUCTION OF RECIPROCATING MOVEMENTS.

1,363,624.    Specification of Letters Patent.    Patented Dec. 28, 1920.

Application filed May 12, 1919. Serial No. 296,588.

*To all whom it may concern:*

Be it known that we, SAM SUNDERLAND, a subject of the King of Great Britain and Ireland, residing at High Utley, Keighley, in the county of York, England, and ARTHUR MAURICE MIDGLEY, a subject of the King of Great Britain and Ireland, residing at Holly Bank, Sutton-in-Craven, near Keighley aforesaid, have jointly invented a certain new and useful Improvement Relating to the Production of Reciprocating Movements, of which the following is a specification.

This invention has for its object, the provision of means for producing and more permanently maintaining an accurate reciprocating motion, than is the case when such motion is obtained by change wheels in conjunction with a threaded screw rotated first in one direction and then in the other, sufficient to produce the varied requisite lengths of the reciprocating movement.

When rotating screws are used, the screw thread does not retain its true pitch for the entire length of screw, it being worn most about mid-traverse, that is to say, the spaces in the thread of screw and nut engaged therewith, become wider where most engaged, causing a gradual inaccurate mechanical movement from about mid-traverse of screw to each end of the reciprocating of screw to each end of the reciprocating movement in machines where the length of the movement varies as is the case when used in connection with wheel teeth cutting machines.

In describing our invention in detail, reference is made to the accompanying sheet of drawings, in which Figure 1 represents a front elevation showing portions of a machine applicable for cutting the teeth spaces in spur wheels, to which our invention is added. Fig. 2 is a side elevation. Fig. 3 a plan partly in section cut through line 3—3 and Figs. 4, 5, 6 and 7 are detached details hereinafter referred to.

In carrying out our invention we dispense with the change gear wheels utilized for rotating the vertical screw in both directions for sliding the horizontally reciprocating rack toothed cutters in a vertical direction the distance required by the pitch and width of the wheel teeth to be cut, and substitute therefor mechanism arranged and operated in the manner as hereinafter described.

We utilize an interchangeable cam 1 and secure it to shaft 2 and rotate the shaft in one direction only, slowly during the cutting operation and more quickly when non-cutting on the downward movement of the rack toothed cutter 3, the cutter being reciprocated horizontally in the ordinary manner such as described in U. S. A. Patent Specification No. 948,830.

Step cone pulley 5 is keyed on shaft 6, upon which are keyed two worms 7 and 8 by which cam shaft 2 is rotated at different rates of speed.

The cam shaft 2 during the teeth cutting process, is rotated by worm 7, meshing with worm wheel 9, secured on shaft 10, and upon the opposite end of said shaft, is keyed a worm meshing with worm wheel 11, free on shaft 2, the rotation of said shaft during the teeth cutting, being accomplished by pawls 12, shown by Fig. 7, the pawls engaging with ratchet teeth 13, formed in the position shown by Fig. 6 cut in circular cam block 14, feather keyed on cam shaft 2, rotated slowly during the teeth cutting process.

In circular block 14, is formed a cam groove 15, utilized for sliding connecting bar 16 to and fro on each revolution of cam shaft 2, the sliding bar being provided with a projecting rigid pin engaging with cam groove, said bar being also provided with a like projecting pin engaging with an annular groove 17, formed in the ratchet toothed member 18 of sliding clutch, the sliding of bar putting said member of clutch into and out of mesh with the other member of clutch provided with like teeth formed on the face of worm wheel 19 rotated in the direction shown by curved arrow in Fig. 2.

Worm 8 imparts rotary motion to worm wheel 8ᴬ secured on shaft 20 rotating shaft 2 at an accelerated speed, effected in a manner similar to that described in connection with worm 7, the difference being, the worm keyed on shaft 20 meshing with worm wheel 19, is multiple threaded.

The interchangeable cam 1 secured on shaft 2, engages with roller 21 by which, on the rotation of said cam, the headstock and rack toothed cutter 3 are operated to and fro, in a vertical direction, the same as described in U. S. A. Patent Specification No. 948,830, and in a horizontal direction by rotating cams 22 and 23, sliding wheel blank 4, into and out of engagement with rack toothed cutter 3.

The periphery of cam 22 engages with roller 24 mounted on pin 25 secured to wheel blank carrying frame 26, and on the rotation of cam 22, frame 26 is caused to slide into the position for the rack toothed cutter 3 to engage with wheel blank 4, and during the time of engagement, the cam is rotating from C to D, in the direction of curved arrow a distance shown by Fig. 4 equal to 240 degrees, and on the prominent portion of cam 23 arriving in contact with roller 25$^B$ mounted on pin 25$^A$ attached to frame 26, said frame is slid and wheel blank 4 forced clear of reciprocating cutter 3, the wheel blank being held in that position during the time the periphery of cam 23, is rotating a distance equal to 120 degrees.

The position of cam 1 in relation to the cam groove 15 formed in circular block 14, is such that, on the member 18 of ratchet toothed clutch being forced into contact with like teeth cut in face of worm wheel 19, revolving at a greater speed than that of worm wheel 11, the speed of circular block 14, and that of cam shaft 2 keyed thereto, are accelerated, the free end of pawls 12, passing freely over the points of the ratchet teeth at 13 cut in circular block 14.

Fig. 6 represents an enlarged sectional view showing more clearly the means employed for giving a slow rotary motion to cam shaft 2 during the teeth cutting period, and an accelerated speed when the wheel blank 4 is moved clear of cutter 3; also the means employed for giving an intermittent rotary motion to sleeve 27 carrying bevel wheel 28, said wheel meshing with a bevel pinion secured on shaft 37. Shaft 37 is geared through change speed gearing 38—39, indicated conventionally in Fig. 1 with shaft 34 on which worm 35 is feather keyed, said worm meshing with dividing wheel 36.

A collar 29 attached to rotating sleeve 27, is provided with an extension 30, formed in an axial direction for engaging in turn with one of a series of openings 31 cut in flange 32, the center of openings being at a distance of 120 degrees apart as shown by Fig. 5.

The flange 32 is keyed to sleeve 33, said sleeve being feather keyed on cam shaft 2, and on flange 32 being slid in the direction of straight arrow in Fig. 6, by the before mentioned connecting bar 16, engaged with the annular groove cut in said sleeve 33, one of the openings 31 is brought into engagement with projection 30, rotating bevel wheel 28 and geared connections accordingly, the bevel wheel rotating 120 degrees during the time the projection 30 is engaged with flange 32 and the indent 22$^A$ of cam 22 in contact with roller 24, and 240 degrees when the circular portion of said cam is in contact with the roller 24 as shown by Fig. 2 during the wheel teeth cutting operation.

The rotation of wheel blank during the upward movement, is accomplished by the periodic rotation of worm shaft 34, the worm 35, feather keyed thereto, engaging with the dividing wheel 36, said shaft being controlled and rotated in a manner as described in the before mentioned patent specification, to which no claim is made as forming part of this invention.

What we claim is:

1. In a wheel teeth cutting machine, a shaft having cams secured thereto for producing vertical movements of cutter and the sliding of wheel blank horizontally into and out of mesh with cutter by gears comprising worm wheel 11 and clutch 18 in combination with flange 32 adapted to rotate dividing wheel 36 through bevel gears arranged and operating substantially as described.

2. In a wheel teeth cutting machine comprising rotating shafts 10 and 20 and geared connections with cam shaft 2, a circular block provided with cam groove 15, a connecting bar engaging cam groove and sleeve 33 combined with flange 32 and bevel gears 28 arranged and operating substantially as described.

In testimony whereof we have set our hands in the presence of two witnesses.

SAM SUNDERLAND.
ARTHUR MAURICE MIDGLEY.

Witnesses:
  JOHN GILL,
  RALPH HARTLEY TOPHAM.